US009379421B2

(12) United States Patent
Garsuch et al.

(10) Patent No.: US 9,379,421 B2
(45) Date of Patent: Jun. 28, 2016

(54) SODIUM-OXYGEN CELLS

(71) Applicant: BASF SE, Ludwigshafen (DE)

(72) Inventors: Arnd Garsuch, Ludwigshafen (DE);
Anna Katharina Duerr, Ludwigshafen (DE); Juergen Janek, Giessen (DE);
Philipp Adelhelm, Giessen (DE); Pascal Hartmann, Giessen (DE)

(73) Assignee: BASF SE, Ludwigshafen (DE)

( * ) Notice: Subject to any disclaimer, the term of this patent is extended or adjusted under 35 U.S.C. 154(b) by 5 days.

(21) Appl. No.: 14/381,264

(22) PCT Filed: Mar. 20, 2013

(86) PCT No.: PCT/IB2013/052209
§ 371 (c)(1),
(2) Date: Aug. 27, 2014

(87) PCT Pub. No.: WO2013/144785
PCT Pub. Date: Oct. 3, 2013

(65) Prior Publication Data
US 2015/0099196 A1    Apr. 9, 2015

Related U.S. Application Data

(60) Provisional application No. 61/615,901, filed on Mar. 27, 2012.

(51) Int. Cl.
| H01M 12/08 | (2006.01) |
| H01M 12/06 | (2006.01) |
| H01M 4/38 | (2006.01) |
| H01M 4/86 | (2006.01) |
| C25B 1/14 | (2006.01) |
| H01M 8/02 | (2016.01) |

(52) U.S. Cl.
CPC ............... *H01M 12/08* (2013.01); *C25B 1/14* (2013.01); *H01M 4/381* (2013.01); *H01M 4/8605* (2013.01); *H01M 8/02* (2013.01); *H01M 12/06* (2013.01); *H01M 2220/20* (2013.01); *H01M 2300/0025* (2013.01); *H01M 2300/0028* (2013.01); *H01M 2300/0037* (2013.01); *Y02E 60/50* (2013.01)

(58) Field of Classification Search
None
See application file for complete search history.

(56) References Cited

U.S. PATENT DOCUMENTS

| 5,051,325 A | 9/1991 | Shishikura et al. |
| 7,259,126 B2 | 8/2007 | Gordon et al. |
| 2002/0192553 A1* | 12/2002 | Barker ............... C01B 25/455 429/224 |
| 2004/0091774 A1* | 5/2004 | Narang ............... H01M 4/364 429/218.1 |
| 2005/0201918 A1 | 9/2005 | Gordon et al. |
| 2007/0117007 A1 | 5/2007 | Visco et al. |
| 2008/0057379 A1 | 3/2008 | Gordon et al. |
| 2008/0058201 A1 | 3/2008 | Gordon et al. |
| 2008/0268327 A1 | 10/2008 | Gordon et al. |
| 2011/0311888 A1 | 12/2011 | Garsuch et al. |
| 2012/0178002 A1 | 7/2012 | Garsuch et al. |
| 2013/0115524 A1 | 5/2013 | Garsuch et al. |

FOREIGN PATENT DOCUMENTS

| CN | 1036105 A | 10/1989 |
| GB | 1136823 A | 12/1968 |
| WO | WO 2007/065899 A1 | 6/2007 |
| WO | WO 2011/148357 A1 | 12/2011 |
| WO | WO 2011/154869 A2 | 12/2011 |
| WO | WO 2012/076229 A1 | 6/2012 |

OTHER PUBLICATIONS

U.S. Appl. No. 14/400,860, filed Nov. 13, 2014, Garsuch, et al.
International Search Report issued Aug. 29, 2013 in PCT/IB2013/052209.
Qian Sun, et al., "Electrochemical properties of room temperature sodium-air batteries with non-aqueous electrolyte" Electrochemistry Communications, vol. 16, 2012, pp. 22-25.
E. Peled, et al., "Parameter analysis of a practical lithium- and sodium-air electric vehicle battery" Journal of Power Sciences, vol. 196, 2011, pp. 6835-6840.
Peter G. Bruce, et al., "Li—$O_2$ and Li—S batteries with high energy storage" Nature Materials, vol. 11, Jan. 2012, pp. 19-29.
Pascal Hartmann, et al., "A rechargeable room-temperature sodium superoxide ($NaO_2$) battery" Nature Materials, Dec. 2012, pp. 228-232.
Extended Search Report issued Jul. 20, 2015 in European Patent Application No. 13768835.4.
Dany Brouillette, et al., "Effect of viscosity and volume on the specific conductivity of lithium salts in solvent mixtures", Electrochimica Acta, vol. 44, No. 26, XP055202002, Sep. 1, 1999, pp. 4721-4742.
D. R. MacFarlane, et al., "Structure-Property Relationships in Plasticized Solid Polymer Electrolytes", vol. 40, No. 13, Oct. 1, 1995, XP004019674, 1995, pp. 2131-2136.

* cited by examiner

*Primary Examiner* — Gregg Cantelmo
(74) *Attorney, Agent, or Firm* — Oblon, McClelland, Maier & Neustadt, L.L.P

(57) ABSTRACT

The present invention relates to sodium oxygen cells comprising (A) at least one anode comprising sodium, (B) at least one gas diffusion electrode comprising at least one porous support, and (C) a liquid electrolyte comprising at least one aprotic glycol diether with a molecular weight $M_n$ of not more than 350 g/mol. The present invention further relates to the use of the invention sodium oxygen cells and to a process for preparing sodium supperoxide of formula $NaO_2$.

18 Claims, No Drawings

SODIUM-OXYGEN CELLS

CROSS-REFERENCE TO RELATED APPLICATIONS

This application is a National Stage of PCT/IB2013/052209 filed on Mar. 20, 2013. This application is based upon and claims the benefit of priority to U.S. Provisional Application No. 61/615,901 filed on Mar. 27, 2012.

BACKGROUND OF THE INVENTION

The present invention relates to sodium oxygen cells comprising
(A) at least one anode comprising sodium,
(B) at least one gas diffusion electrode comprising at least one porous support, and
(C) a liquid electrolyte comprising at least one aprotic glycol diether with a molecular weight $M_n$ of not more than 350 g/mol.

The present invention further relates to the use of the inventive sodium oxygen cells and to a process for preparing sodium superoxide of formula $NaO_2$.

Secondary batteries, accumulators or rechargeable batteries are just some embodiments by which electrical energy can be stored after generation and used when required. Due to the significantly better power density, there has been a move in recent times away from the water-based secondary batteries to development of batteries in which the charge transport in the electrical cell is accomplished by lithium ions.

However, the energy density of conventional lithium ion accumulators which have a carbon anode and a cathode based on metal oxides is limited. New horizons with regard to energy density have been opened up by lithium-sulfur cells and in particular by alkali metal-oxygen cells. In one typical embodiment, an alkali metal like lithium or sodium is oxidized with atmospheric oxygen in a non-aqueous electrolyte to form an oxide or a peroxide, i.e., to form $Li_2O$ or $Li_2O_2$. The energy released is utilized electrochemically. Batteries of this kind can be recharged by reduction of the alkali metal ions formed in the discharge. For this purpose, the use of gas diffusion electrodes (GDEs) as the cathode is known. Gas diffusion electrodes are porous and have bifunctional actions. Alkali-metal-air batteries must enable the reduction of the atmospheric oxygen to oxide or peroxide ions in the course of discharging, and the oxidation of the oxide or peroxide ions to oxygen in the course of charging. For this purpose, for example, the construction of gas diffusion electrodes on a carrier material composed of finely divided carbon is known, said carrier material comprising one or more catalysts for catalysis of the oxygen reduction or of the oxygen evolution.

Peled et al., J. Power Sources 196 (2011) 6835-6840, compare lithium-air batteries with sodium-air batteries. They propose to replace metallic lithium anode by liquid sodium and to operate the sodium-oxygen cell above the melting point of sodium (97.8° C.).

Sun et al., Electrochemistry Communications 16 (2012) 22-25, describe electrochemical properties of room temperature sodium-air batteries with non-aqueous electrolyte. A mixture of ethylene carbonate and dimethyl carbonate was used as solvent. $Na_2O_2$, $Na_2CO_3$ and NaOCO—R have been found as discharging products at cathode side indicating the decomposition of the organic carbonates. The authors speculate about the theoretical formation of sodium superoxide as an intermediate and its decomposition during the reduction of oxygen $O_2$ to sodium peroxide $Na_2O_2$.

GB 1,136,823 describes the formation of sodium superoxide by oxygenation of a solution of sodium in liquid ammonia in the presence of bipyridyl.

All the sodium-oxygen or sodium-air batteries known from the prior art cited above and their components can still be improved with respect to at least one of the following properties: operability at room temperature, oxygen-evolution reaction during recharging at reduced overvoltage, oxygen reduction during discharging at reduced overvoltage, resistance to chemicals, electrochemical corrosion resistance, mechanical stability and lifetime of the electrochemical cells or batteries.

It was also an object of the present invention to provide a simple method for the formation of sodium superoxide in order to study the potential and the properties of this first reduction product of molecular oxygen in sodium-oxygen or sodium-air batteries.

Accordingly, the sodium oxygen cells defined at the outset have been found, hereinafter also referenced as inventive cells.

Inventive cells comprise
(A) at least one anode comprising sodium,
(B) at least one gas diffusion electrode comprising at least one porous support, and
(C) a liquid electrolyte comprising at least one aprotic glycol diether with a molecular weight $M_n$ of not more than 350 g/mol.

In the context with the present invention, the electrode where during discharging a net negative charge occurs is called the anode.

Inventive sodium oxygen cells comprise at least one anode comprising sodium. In the context of the present invention, this anode comprising sodium is also called anode (A) for short.

The sodium of anode (A) is in the oxidation state zero. The source of the sodium in the oxidation state zero can be selected from the group consisting of metallic sodium, sodium amalgam, sodium-tin-alloy, sodium-silicon-alloy and intercalation products of metallic sodium with hard carbons and/or soft carbons, preferably metallic sodium.

In one embodiment of the present invention, the inventive sodium oxygen cell is characterized in that the sodium of anode (A) is metallic sodium.

In addition, anode (A) may have further constituents customary per se, for example an output conductor which may be configured in the form of a metal wire, metal grid, metal mesh, expanded metal, or metal foil or metal sheet. A suitable output conductor is selected by the person skilled in the art depending on the nature of the sodium of anode (A).

In one embodiment of the present invention, anode (A) has a thickness in the range from 15 to 1000 µm, preferably from 30 to 100 µm, based on the thickness without output conductor.

In the context with the present invention, the electrode where during discharging a net positive charge occurs is called the cathode. The cathodes of the present inventive electrochemical cells wherein molecular oxygen $O_2$ is used as oxidant during discharging, are gas diffusion electrodes. Gas diffusion electrodes, which are permeable to oxidizing gases, in particular to molecular oxygen $O_2$, are known.

Inventive electrochemical cells comprise at least one gas diffusion electrode comprising at least one porous support. In the context of the present invention, this gas diffusion electrode is also called electrode (B) or gas diffusion electrode (B) for short.

The porous support of the gas diffusion electrode is such a material or composition through which oxygen or air can diffuse even without application of elevated pressure, for example metal meshes and gas diffusion media composed of carbon, especially activated carbon, and carbon on metal mesh. The gas permeability can be determined, for example by the Gurley method in analogy to the measurement of the gas permeability of paper or paperboard or by the "through plane air permeability" according to DIN EN ISO 9273.

In one embodiment of the present invention, oxygen, air or atmospheric oxygen can flow essentially unhindered through the porous support of electrode (B).

Preferably the porous support of the gas diffusion electrode is a material or composition which conducts the electrical current. Preferably such a material or composition comprises at least one electrically conductive material.

In one embodiment of the present invention, the inventive sodium oxygen cell is characterized in that the porous support of the gas diffusion electrode (B) comprises at least one electrically conductive material.

In a preferred embodiment of the present invention, the porous support of electrode (B) is chemically inert with respect to the reactions which proceed in an electrochemical cell in standard operation, i.e. in the course of charging and in the course of discharging.

In one embodiment of the present invention, the porous support of electrode (B) has an internal BET surface area in the range from 0.5 to 1500 $m^2/g$, which is preferably referred to as the apparent BET surface area.

In one embodiment of the present invention, the porous support of electrode (B) is selected from metal meshes, for example nickel meshes or tantalum meshes. Metal meshes may be coarse or fine.

In another embodiment of the present invention, the porous support of electrode (B) is selected from electrically conductive fabrics, for example mats, felts or fibrous nonwoven webs of carbon fibers or carbon which comprise metal filaments, for example tantalum filaments, stainless steel filaments or nickel filaments.

In one embodiment of the present invention, the porous support of electrode (B) or the electrically conductive material is selected from the group consisting of activated carbon, aluminum-doped zinc oxide, antimony-doped tin oxide, fluorine-doped tin dioxide and porous carbides or nitrides, for example WC, $Mo_2C$, $Mo_2N$, TiN, ZrN or TaC.

In another embodiment of the present invention, the electrode (B) comprises carbon, in particular carbon in a polymorph comprising at least 60% $sp^2$-hybridized carbon atoms, as described in WO 2011/148357, page 4, line 21 to page 5, line 25. Preferably this carbon is in the form of particles having a diameter in the range from 0.1 to 100 µm, preferably 2 to 20 µm. The particle diameter is understood to mean the mean diameter of the secondary particles, determined as the volume average.

In one embodiment of the present invention, the inventive sodium oxygen cell is characterized in that the porous support of the gas diffusion electrode (B) comprises at least one carbonaceous electrically conductive material, like graphite, activated carbon, carbon black, carbon fibers, carbon nanotubes, graphene or mixtures of at least two of the aforementioned substances, in particular carbon fibers.

In a preferred embodiment of the present invention, the gas diffusion electrode (B) comprises at least a catalyst enabling the reduction of oxygen to oxide species like superoxide, peroxide or oxide ions in the course of discharging and at least a catalyst enabling the oxidation of the negatively charged oxide species to oxygen in the course of charging. It is possible to use the same catalyst for both reactions or to use different catalysts for both reactions.

Suitable catalysts are, in particular, mixed oxides, for example cobalt oxides, nickel oxides, iron oxides, chromium oxides, tungsten oxides, and also noble metals, in particular silver. In a preferred embodiment, a catalyst combination of a catalyst which catalyzes the reduction of oxygen and a bifunctional catalyst as described in WO 2007/065899 A1, page 7, line 14 to page 8, line 27, is used. A preferred catalyst which both catalyzes the oxygen oxidation and also reduction is $La_2O_3$. Preferred catalysts for the reduction of oxygen are $MnO_2$, $KMnO_4$, $MnSO_4$, $SnO_2$, $Fe_2O_3$, $Co_3O_4$, Co, CoO, Fe, Pt, Pd, $Ag_2O$, Ag, spinels and perovskites. A particularly preferred discharging catalyst is silver (Ag), in particular as powder having a surface area of from 0.1 to 80 $m^2/g$. A particularly preferred charging catalyst is $Fe_2(WO_4)_3$.

Molecular oxygen $O_2$ is reduced during discharging of the inventive sodium oxygen cells at the gas diffusion electrode. The necessary molecular oxygen $O_2$ can be used in form of a gas with a high purity, for example in purity of higher than 99.9%, or diluted with one or more additional gases, preferably chemically inert gases. A preferred form of diluted oxygen is air.

In a particularly preferred embodiment of the present invention, the porous support of electrode (B) does not comprise a catalyst enabling the reduction of molecular oxygen.

In one embodiment of the present invention, the gas diffusion electrode (B) comprises sodium superoxide $NaO_2$, in particular solid sodium superoxide $NaO_2$, after discharging the cell.

In one embodiment of the present invention, the inventive sodium oxygen cell is characterized in that after discharging the cell the porous support of the gas diffusion electrode (B) comprises sodium superoxide $NaO_2$, in particular solid sodium superoxide $NaO_2$. Solid sodium superoxide may be amorphous or crystalline. Preferably the solid sodium superoxide is crystalline.

In addition, cathode (B) may have further constituents customary per se, for example an output conductor which may be configured in the form of a metal wire, metal grid, metal mesh, expanded metal, or metal foil or metal sheet, wherein a preferred metal is stainless steel.

Inventive sodium oxygen cells comprise a liquid electrolyte comprising at least one aprotic glycol diether with a molecular weight $M_n$ of not more than 350 g/mol. In the context of the present invention the liquid electrolyte is also called liquid electrolyte (C) or electrolyte (C) for short.

The characteristics of aprotic solvents are the absence of hydrogen bonding, the absence of acidic hydrogen bound to an oxygen atom or a nitrogen atom and the ability to stabilize ions.

The molecular weight $M_n$ of the aprotic glycol diether is in the range from 88 g/mol to 350 g/mol.

Non limiting examples of aprotic glycol diethers are mono- or oligoalkylene glycol diethers, preferably mono- or oligo-$C_1$-$C_4$-alkylene glycol diethers and especially mono- or oligoethylene glycol diethers. Preferred aprotic glycol diethers are based on the monomers ethylene oxide or propylene oxide or mixtures of these two monomers. Particularly preferred aprotic glycol diethers are based on the monomer ethylene oxide.

The aprotic glycol diethers are preferably doubly capped with alkyl groups, particularly preferably capped with methyl or ethyl groups, in particular capped with two methyl groups.

In one embodiment of the present invention, the inventive sodium oxygen cell is characterized in that the aprotic glycol diether is a polyether of formula I

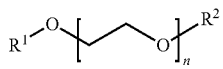

(I)

wherein $R^1$, $R^2$ are identical or different, and are each methyl or ethyl, preferably methyl and n is 1, 2, 3 or 4, preferably 2 or 3, in particular 2.

The liquid electrolyte (C) which comprises at least one aprotic glycol diether with a molecular weight $M_n$ of not more than 350 g/mol, may also comprise a mixture of said aprotic glycol diethers, for example a mixture of diglyme and triglyme or a mixture of diglyme, triglyme and tetraglyme.

In one embodiment of the present invention, the electrolyte (C) of the inventive sodium oxygen cell comprises in the range from 50 to 99.5% by weight, preferably 80 to 95% by weight, of the sum of aprotic glycol diethers with a molecular weight $M_n$ of not more than 350 g/mol.

The liquid electrolyte (C) of the inventive sodium oxygen cell is preferably used in the so-called water-free state, i.e. at a water content in the range from 1 ppm to 0.1% by weight, as can be determined by Karl Fischer titration for example.

In one embodiment of the present invention, the inventive sodium oxygen cell is characterized in that the liquid electrolyte (C) additionally comprises at least one sodium-containing conductive salt.

Examples of suitable sodium-containing conductive salts are $NaPF_6$, $NaBF_4$, $NaClO_4$, $NaAsF_6$, $NaCF_3SO_3$, $NaC(C_nF_{2n+1}SO_2)_3$, sodium bis-(oxalato)borate, sodium difluoro(oxalate)borate, sodium imides such as $NaN(C_nF_{2n+1}SO_2)_2$, where n is an integer in the range from 1 to 20, $NaN(SO_2F)_2$, $Na_2SiF_6$, $NaSbF_6$, $NaAlCl_4$, and salts of the general formula $(C_nF_{2n+1}SO_2)_mXNa$, where m is defined as follows:

m=1, when X is selected from oxygen and sulfur, m=2, when X is selected from nitrogen and phosphorus, and m=3, when X is selected from carbon and silicon.

Preferred conducting salts are selected from $NaCF_3SO_3$, $NaC(CF_3SO_2)_3$, $NaN(CF_3SO_2)_2$, $NaPF_6$, $NaBF_4$, $NaClO_4$, and particular preference is given to $NaPF_6$ and $NaCF_3SO_3$ The liquid electrolyte (C), which comprises at least one sodium-containing conductive salt, may also comprise a mixture of said sodium-containing conductive salts, for example a mixture of $NaCF_3SO_3$ and $(C_4F_9SO_2)ONa$.

The liquid electrolyte (C) of the inventive sodium oxygen cell preferably comprises in the range from 0.5 to 20% by weight, preferably 4 to 15% by weight, of the sum of sodium-containing conductive salts.

The liquid electrolyte (C), which preferably comprises at least one aprotic glycol diether with a molecular weight $M_n$ of not more than 350 g/mol and at least one sodium-containing conductive salt, may also comprise additional components like DMSO, an ionic liquid or a crown ether like 15-crown-5.

The liquid electrolyte (C) is preferably liquid in a temperature range from −30° C. to 50° C. In order to provide sufficient ion conductivity the liquid electrolyte preferably has a viscosity of less than 100 cP at 20° C.

In one embodiment of the present invention, the inventive sodium oxygen cell is characterized in that the liquid electrolyte has a viscosity of less than 80 cP, preferably less than 40 cP, in particular a viscosity in the range from 0.2 to 20 cP at 20° C.

The viscosity stated in cP (centipoise) is the dynamic viscosity. The dynamic viscosity of a liquid is calculated by multiplying the kinematic viscosity with the density of the liquid. The kinematic viscosity is determined according to DIN 51562-1 with a Ubbelohde type viscometer.

In one embodiment of the present invention, inventive sodium oxygen cell comprise one or more separators by which the electrodes are mechanically separated. Suitable separators are polymer films, especially porous polymer films, which are unreactive toward metallic sodium and towards oxygen and lithium oxide species like $NaO_2$ or $Na_2O_2$ and towards the components of the electrolyte. Particularly suitable materials for separators are polyolefins, especially porous polyethylene in film form and porous polypropylene in film form.

Separators made from polyolefin, especially made from polyethylene or polypropylene, may have a porosity in the range from 35 to 45%. Suitable pore diameters are, for example, in the range from 30 to 500 nm.

In another embodiment of the present invention, the separators selected may be separators made from PET nonwovens filled with inorganic particles. Such separators may have a porosity in the range from 40 to 55%. Suitable pore diameters are, for example, in the range from 80 to 750 nm.

In another embodiment of the present invention, the separators selected may be separators made from inorganic nonwovens such as glass fiber nonwovens and ceramic fiber nonwovens.

In another embodiment of the present invention, the separators selected may be separators made from thin layers of inorganic materials which are permeable to sodium ions like beta-alumina or NaSICON ($Na_3Zr_2Si_2PO_{12}$).

During discharging the inventive sodium oxygen cell sodium superoxide $NaO_2$ is formed at the gas diffusion electrode (B). The formed superoxide ions can be oxidized to molecular oxygen during charging the cell.

In one embodiment of the present invention, the inventive sodium oxygen cell is characterized in that the sodium oxygen cell is a rechargeable sodium oxygen cell.

Inventive sodium oxygen cells are notable for particularly high capacitances, improved mechanical stability, high performance even after repeated charging, improved charging and discharging rates at low overvoltages, and/or significantly delayed cell death. Inventive electrical cells are very suitable for use in automobiles, electric bicycles, aircraft, ships or stationary energy stores. The inventive electrical cells are also suitable for use in portable mobile devices such as computers, especially laptops, telephones, hearing aids or electrical power tools, for example from the construction sector, especially drills, battery-driven screwdrivers or battery-driven tackers. Such uses in mobile and stationary applications form a further part of the subject matter of the present invention.

The present invention further provides for the use of inventive sodium oxygen cells as described above in automobiles, electric bicycles, aircraft, ships or stationary energy stores.

The inventive sodium oxygen cells as described above can be used to produce sodium superoxide of formula $NaO_2$, in particular solid sodium superoxide of formula $NaO_2$ during discharging the inventive cell.

The present invention further provides a process for preparing sodium superoxide of formula $NaO_2$, in particular solid sodium superoxide of formula $NaO_2$ comprising at least one electrochemical reaction step wherein molecular oxygen $O_2$ is reduced to $O_2^-$ during discharging the inventive sodium oxygen cell as described above. The components of the inventive sodium oxygen cell, in particular anode (A), gas diffusion electrode (B) and liquid electrolyte (C) are each as defined above, especially also with regard to preferred embodiments thereof.

The present invention likewise also provides a process for preparing sodium superoxide of formula $NaO_2$, in particular solid sodium superoxide of formula $NaO_2$, comprising at least one electrochemical reaction step wherein in an electrochemical cell comprising (A) at least one anode comprising sodium,
(B) at least one gas diffusion electrode comprising at least one porous support, and
(C) a liquid electrolyte comprising at least one aprotic glycol diether with a molecular weight $M_n$ of not more than 350 g/mol and at least one sodium-containing conductive salt, Na is oxidized to $Na^+$ at the anode (A) and molecular oxygen $O_2$ is reduced to $O_2^-$ at the gas diffusion electrode (B).

In one embodiment of the present invention, the inventive process for preparing sodium superoxide of formula $NaO_2$ is characterized in that the electrochemical cell in which the at least one electrochemical reaction step takes place, is the inventive sodium oxygen cell described above.

The components of the electrochemical cell, preferably the inventive sodium oxygen cell, in particular anode (A), gas diffusion electrode (B) and liquid electrolyte (C) are each as defined above, especially also with regard to preferred embodiments thereof.

In one embodiment of the present invention, the inventive process for preparing sodium superoxide of formula $NaO_2$ is characterized in that the porous support of the gas diffusion electrode (B) comprises at least one electrically conductive material, preferably at least one electrically conductive carbonaceous material, in particular a material comprising carbon fibers.

The liquid electrolyte (C) comprises at least one aprotic glycol diether with a molecular weight $M_n$ of not more than 350 g/mol and at least one sodium-containing conductive salt. Preferred aprotic glycol diethers and preferred sodium-containing conductive salt have been described above.

In one embodiment of the present invention, the inventive process for preparing sodium superoxide of formula $NaO_2$ is characterized in that the aprotic glycol diether is a polyether of formula I

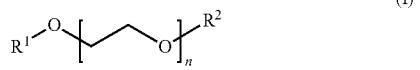

(I)

wherein $R^1$, $R^2$ are identical or different, and are each methyl or ethyl, preferably methyl, and n is 1, 2, 3 or 4, preferably 2 or 3, in particular 2.

A preferred range for the viscosity of the liquid electrolyte of the inventive sodium oxygen cell has been described above. This range is also preferred in the inventive process for preparing sodium superoxide.

In another embodiment of the present invention, the inventive process for preparing sodium superoxide of formula $NaO_2$ is characterized in that the liquid electrolyte has a viscosity of less than 80 cP, preferably less than 40 cP, in particular a viscosity in the range from 0.2 to 20 cP at 20° C.

Preferably, the electrochemical reaction step of the process for preparing sodium superoxide of formula $NaO_2$ is carried out in a temperature range between −30° C. to 50° C., particularly preferably between 0° C. and 40° C.

In another embodiment of the present invention, the inventive process for preparing sodium superoxide of formula $NaO_2$ is characterized in that the electrochemical reaction step takes place at a temperature in the range from 0° C. up to 40° C.

In the electrochemical cell sodium superoxide of formula $NaO_2$ may be dissolved in the liquid electrolyte or crystalizes directly at the gas diffusion electrode during discharging. Sodium superoxide may be isolate in solid form, in particular in crystalline form, from the gas diffusion electrode by mechanical means after disassembling the electrochemical cell. Another option is the isolation of sodium superoxide from the liquid electrolyte around the gas diffusion electrode for example by crystallization. The isolation of sodium superoxide from the liquid electrolyte may be done batch-wise or continuously. For example in a continuous process new liquid electrolyte is added to the cathode region while liquid electrolyte comprising sodium superoxide is removed during discharging in such a manner, that the total volume of the electrolyte in the cell is kept constant.

The invention is illustrated by the examples which follow, which do not, however, restrict the invention.

Figures in % relate to percent by weight, unless explicitly stated otherwise.

I. Producing an Inventive Electrochemical Cell and Testing 1.1 Cell Assembly

The used cell hardware was a modified ¼ inch Swagelok design, consisting of sodium metal foil (thickness: 500 μm) as anode, glass microfiber filters (GF/A, Whatman) as separator, and a gas diffusion layer made from carbon fibers (non-woven fabric of carbon fibers; area weight: 95 g/m²; thickness at 0.025 MPa: 210 μm; average diameter of the carbon fibers: 10 μm; commercially available as Freudenberg gas diffusion layer H2315 from Quintech,) as porous support of the cathode. No additional catalyst was used. The average cathode area, thickness and mass were 1.13 cm², 210 μm and 11 mg, respectively. Diethylene glycol dimethyl ether, ($C_6H_{14}O_3$, DEGDME), (anhydrous, 99.5% Sigma Aldrich) was used as solvent for the electrolyte. Sodium triflate (98%, Aldrich) was used as conducting salt and dried under vacuum at 75° C. for 24 hours. The electrolyte solution of 0.5 M Na $CF_3SO_3$ in DEGDME was prepared in a glove box. Both solvent and resulting electrolyte were dried over metallic sodium. The final water content of the electrolyte was determined with a 831 KF Karl Fischer coulometer (Metrohm) to be less than 20 ppm. The amount of electrolyte in the cell was 85 μL, and additional 30 μL were added for the connection of the reference electrode. Cell assembling was done in argon filled glove boxes (MBraun Labmaster and Jacomex) at water and oxygen contents below 1 ppm.

1.2 Cell Testing

Cell tests were performed galvanostatically at room temperature, using battery cycling systems from Maccor (4300) and Biologic (VMP3). Before measuring, the cells were flushed with oxygen (purity 5.0, Praxair) for 10 seconds at 1.5 bar. The total volume of the oxygen reservoir was approx. 6 cm³. The lower and upper cut off limits for the voltage were 1.7 V vs. Na/Na+ and 3.7 V vs. Na/Na+, respectively. Every measurement started with a 2 hour recording of the open circuit potential to assure equilibrium in the cell. The discharge voltage was approximately 2.2 V. During charging the voltage was 2.3 V.

Sodium superoxide was characterized by 1) x-ray diffraction of a discharged cathode. All reflections could be assigned to either, the carbon cathode, the stainless steel sample holder or sodium superoxide according to JCPDS card No. 01-077-

[0207] In addition a single particle of the discharge product was analyzed in a Raman microscope. The obtained Raman spectrum showed a single characteristic intensity maximum at 1156 cm$^{-1}$ that was also observed for NaO$_2$ single crystals by Bösch et al. (Phys. Kondens Matter 16 (1973) 107-112). Further we measured the average chemical composition of a discharge product particle by energy dispersive x-ray spectroscopy in a scanning electron microscope. The ratio O:Na was determined to be 1.85:1 (theoretically it is 2:1).

The invention claimed is:

1. A sodium oxygen cell, comprising:
   (A) an anode comprising sodium;
   (B) a gas diffusion electrode comprising a porous support; and
   (C) a liquid electrolyte comprising at least one aprotic glycol diether with a molecular weight M$_n$ of not more than 350 g/mol,
   wherein: the liquid electrolyte (C) comprises from 80 to 95% by weight of a sum of the at least one aprotic glycol diether; and
   the liquid electrolyte (C) contacts both of the anode (A) and the gas diffusion electrode (B).

2. The cell according to claim 1, wherein the sodium of the anode (A) is metallic sodium.

3. The cell according to claim 1, wherein the porous support of the gas diffusion electrode (B) comprises an electrically conductive material.

4. The cell according to claim 1, wherein the gas diffusion electrode (B) comprises sodium superoxide NaO$_2$, after discharging the cell.

5. The sodium oxygen cell according to claim 1, wherein the at least one aprotic glycol diether is a polyether of formula (I):

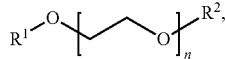

(I)

wherein:
R$^1$, R$^2$ are identical or different, and are each independently methyl or ethyl; and
n is 1, 2, 3 or 4.

6. The cell according to claim 1, wherein the liquid electrolyte (C) additionally comprises a sodium-containing conductive salt.

7. The cell according to claim 1, wherein the liquid electrolyte (C) has a viscosity of less than 80 cP at 20° C.

8. The cell according to claim 1, wherein the sodium oxygen cell is a rechargeable sodium oxygen cell.

9. An article comprising the sodium oxygen cell of claim 1, wherein the article is selected from the group consisting of an automobile, an electric bicycle, an aircraft, a ship and a stationary energy store.

10. A process for preparing sodium superoxide of formula NaO$_2$, the process comprising performing electrochemical reaction which comprises reducing molecular oxygen O$_2$ to O$_2^-$ during a discharging of the sodium oxygen cell according to claim 1.

11. The cell according claim 4, wherein the gas diffusion electrode (B) comprises sodium superoxide NaO$_2$, after discharging the cell.

12. The process according to claim 10, wherein the sodium superoxide is solid sodium superoxide.

13. A process for preparing sodium superoxide of formula NaO$_2$, the process comprising performing an electrochemical reaction in an electrochemical cell comprising:
   (A) an anode comprising sodium;
   (B) a gas diffusion electrode comprising a porous support; and
   (C) a liquid electrolyte comprising at least one aprotic glycol diether with a molecular weight M$_n$ of not more than 350 g/mol and a sodium-containing conductive salt,
   wherein the electrochemical reaction comprises oxidizing Na to Na* at the anode (A) and reducing molecular oxygen O$_2$ to a$_2^-$ at the gas diffusion electrode (B).

14. The process according to claim 13, wherein the porous support of the gas diffusion electrode (B) comprises an electrically conductive material.

15. The process according to claim 13 wherein the at least one aprotic glycol diether is a polyether of formula (I):

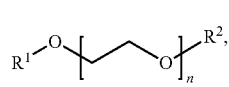

(I)

wherein:
R$^1$, R$^2$ are identical or different, and are each independently methyl or ethyl; and
n is 1, 2, 3 or 4.

16. The process according to claim 13, wherein the liquid electrolyte (C) has a viscosity of less than 80 cP at 20° C.

17. The process according to claim 13, wherein the electrochemical reaction takes place at a temperature from 0° C. up to 40° C.

18. The process according to claim 13, wherein the sodium superoxide is solid sodium superoxide.

* * * * *